United States Patent
Gervais (10) Patent No.: US 11,079,134 B2
(45) Date of Patent: *Aug. 3, 2021

(54) COMPUTING DEVICE AND METHOD FOR INFERRING VIA A NEURAL NETWORK A TWO-DIMENSIONAL TEMPERATURE MAPPING OF AN AREA

(71) Applicant: Distech Controls Inc., Brossard (CA)

(72) Inventor: Francois Gervais, Lachine (CA)

(73) Assignee: DISTECH CONTROLS INC., Brossard (CA)

(*) Notice: Subject to any disclaimer, the term of this patent is extended or adjusted under 35 U.S.C. 154(b) by 61 days.

This patent is subject to a terminal disclaimer.

(21) Appl. No.: 16/225,764

(22) Filed: Dec. 19, 2018

(65) Prior Publication Data

US 2020/0200423 A1 Jun. 25, 2020

(51) Int. Cl.
| F24F 11/63 | (2018.01) |
| F24F 11/50 | (2018.01) |
| G06N 3/08 | (2006.01) |
| G06N 5/04 | (2006.01) |
| F24F 110/10 | (2018.01) |

(52) U.S. Cl.
CPC .............. *F24F 11/63* (2018.01); *F24F 11/50* (2018.01); *G06N 3/08* (2013.01); *G06N 5/046* (2013.01); *F24F 2110/10* (2018.01)

(58) Field of Classification Search
CPC .......... G06N 3/08; G06N 5/94; F24F 2110/10
USPC ........................................................ 700/299
See application file for complete search history.

(56) References Cited

U.S. PATENT DOCUMENTS

| 2012/0284216 A1 | 11/2012 | Hamann et al. | |
| 2013/0085614 A1* | 4/2013 | Wenzel | G05D 23/1923 700/277 |
| 2014/0324244 A1* | 10/2014 | Musunuri | G05B 15/02 700/299 |

(Continued)

OTHER PUBLICATIONS

Liu, et al. "A neural network evaluation model for individual thermal comfort", Energy and Buildings 39 (2007) p. 111 5-11 22. (Year : 2007).*

(Continued)

*Primary Examiner* — Md Azad
(74) *Attorney, Agent, or Firm* — RatnerPrestia (57) ABSTRACT

Computing device and method for inferring via a neural network a two-dimensional temperature mapping of an area. A predictive model is stored by the computing device. The computing device receives a plurality of temperature measurements transmitted by a corresponding plurality of temperature sensors located at a corresponding plurality of locations on a periphery of the area. The computing device executes a neural network inference engine, using the predictive model for inferring outputs based on inputs. The inputs comprise the plurality of temperature measurements. The outputs consist of a plurality of temperature values at a corresponding plurality of zones, the plurality of zones being comprised in a two-dimensional grid mapped on a plane within the area. For instance, the area is a room of a building, the periphery is an interface of a ceiling and walls of the room, and the plane is a horizontal plane within the room.

16 Claims, 9 Drawing Sheets

(56) References Cited

U.S. PATENT DOCUMENTS

2016/0341436 A1* 11/2016 Parker .................... H05B 45/20
2019/0353377 A1* 11/2019 Mao ........................ F24F 11/62

OTHER PUBLICATIONS

Mustafaraj, et al. "Prediction of room temperature and relative humidity by auto-regressive linear and nonlinear neural network models for an open office", Energy and Buildings 43 (2011) pp. 1452-1460 (Year: 2011).*

Ferreira, et al. "Neural network PMV estimation for model-based predictive control of HVAC systems", WCCI 2012 IEEE, IJCNN, Brisbane, Australia, QLD, 2012, pp. 1-8 (Year: 2012).*

* cited by examiner

COMPUTING DEVICE AND METHOD FOR INFERRING VIA A NEURAL NETWORK A TWO-DIMENSIONAL TEMPERATURE MAPPING OF AN AREA

TECHNICAL FIELD

The present disclosure relates to the field of building automation, and more precisely temperature control in an area of a building. More specifically, the present disclosure presents a computing device and a method for inferring via a neural network a two-dimensional temperature mapping of an area.

BACKGROUND

Systems for controlling environmental conditions, for example in buildings, are becoming increasingly sophisticated. An environment control system may at once control heating and cooling, monitor air quality, detect hazardous conditions such as fire, carbon monoxide release, intrusion, and the like. Such environment control systems generally include at least one environment controller, which receives measured environmental values, generally from external sensors, and in turn determines set-points or command parameters to be sent to controlled appliances.

The environment controller and the devices under its control (sensors, controlled appliances, etc.) are generally referred to as Environment Control Devices (ECDs). An ECD comprises processing capabilities for processing data received via one or more communication interface and/or generating data transmitted via the one or more communication interface.

A traditional use case in environment control systems consists in measuring (by a temperature sensor) a temperature in an area of a building (e.g. in a room). The temperature measurement is processed by an environment controller for controlling one or more appliances. The temperature measurement is used alone or in combination with other environmental data (e.g. a humidity level) measured by other types of sensors (e.g. a humidity sensor).

However, the temperature distribution in an area is generally not uniform. Therefore, the temperature measurement provided by a single temperature sensor is a more or less accurate representation of the real temperature in various zones of the area. If the temperature sensor is close to a window, the temperature measurement may be overestimated in summer and underestimated in winter. Similarly, if the temperature sensor is close to a source of heating, the temperature measurement is overestimated; and if the temperature sensor is close to a source of cooling, the temperature measurement is underestimated.

Current advances in artificial intelligence, and more specifically in neural networks, can be taken advantage of in the field of environment control systems for more accurately estimating the temperature at various locations within an area such as a room.

Therefore, there is a need for a computing device and a method for inferring via a neural network a two-dimensional temperature mapping of an area.

SUMMARY

According to a first aspect, the present disclosure relates to a method for inferring via a neural network a two-dimensional temperature mapping of an area. The method comprises storing a predictive model in a memory of a computing device. The method comprises receiving, by a processing unit of the computing device, a plurality of temperature measurements transmitted by a corresponding plurality of temperature sensors located at a corresponding plurality of locations on a periphery of the area. The method comprises executing, by the processing unit of the computing device, a neural network inference engine using the predictive model for inferring outputs based on inputs. The inputs comprise the plurality of temperature measurements. The outputs consist of a plurality of temperature values at a corresponding plurality of zones, the plurality of zones being comprised in a two-dimensional grid mapped on a plane within the area.

According to a second aspect, the present disclosure relates to a non-transitory computer program product comprising instructions executable by a processing unit of a computing device. The execution of the instructions by the processing unit of the computing device provides for inferring via a neural network a two-dimensional temperature mapping of an area, by implementing the aforementioned method.

According to a third aspect, the present disclosure relates to a computing device. The computing device comprises at least one communication interface, memory for storing a predictive model, and a processing unit. The processing unit receives, via the at least one communication interface, a plurality of temperature measurements transmitted by a corresponding plurality of temperature sensors located at a corresponding plurality of locations on a periphery of the area. The processing unit executes a neural network inference engine, using the predictive model for inferring outputs based on inputs. The inputs comprise the plurality of temperature measurements. The outputs consist of a plurality of temperature values at a corresponding plurality of zones, the plurality of zones being comprised in a two-dimensional grid mapped on a plane within the area.

In a particular aspect, the area is located in a building.

In another particular aspect, the periphery of the area is an interface of a ceiling and walls of a room.

In still another particular aspect, the plane within the area is a horizontal plane parallel to a floor of a room and located at a given height above the floor.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to environment control systems for buildings. More particularly, the present disclosure aims at providing solutions for accurately estimating the temperature at various locations within an area of a building (e.g. at various location in a room of the building) through the use of a neural network.

The following terminology is used throughout the present specification:

Environment: condition(s) (temperature, pressure, oxygen level, light level, security, etc.) prevailing in a controlled area or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment (a building). The environmental characteristic comprises any of the following: temperature, pressure, humidity, lighting, CO2, flow, radiation, water level, speed, sound; a variation of at least one of the following, temperature, pressure, humidity and lighting, CO2 levels, flows, radiations, water levels, speed, sound levels, etc., and/or a combination thereof.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Environmental state: a current condition of an environment based on an environmental characteristic, each environmental state may comprise a range of values or verifiable representation for the corresponding environmental characteristic.

VAV appliance: a Variable Air Volume appliance is a type of heating, ventilating, and/or air-conditioning (HVAC) system. By contrast to a Constant Air Volume (CAV) appliance, which supplies a constant airflow at a variable temperature, a VAV appliance varies the airflow at a constant temperature.

Area of a building: the expression 'area of a building' is used throughout the present specification to refer to the interior of a whole building or a portion of the interior of the building such as, without limitation: a floor, a room, an aisle, etc.

Referring now concurrently to FIGS. 1, 2, 3A, 3B, 3C, 3D, 4 and 5, an environment controller 100 and a method 500 for inferring via a neural network a two-dimensional temperature mapping of an area are illustrated.

Figure 1:
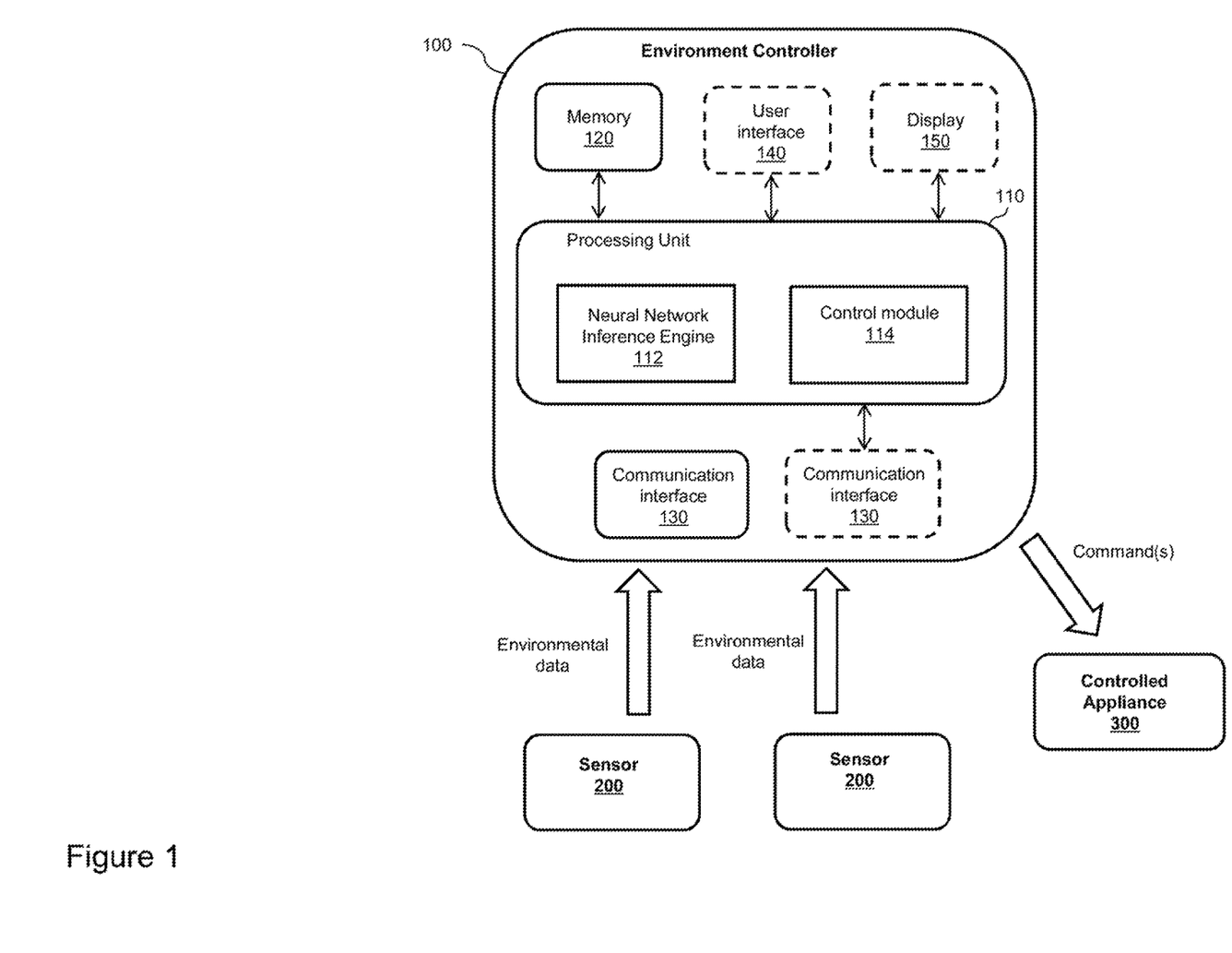
FIG. 1 illustrates an environment control system.
Figure 2:
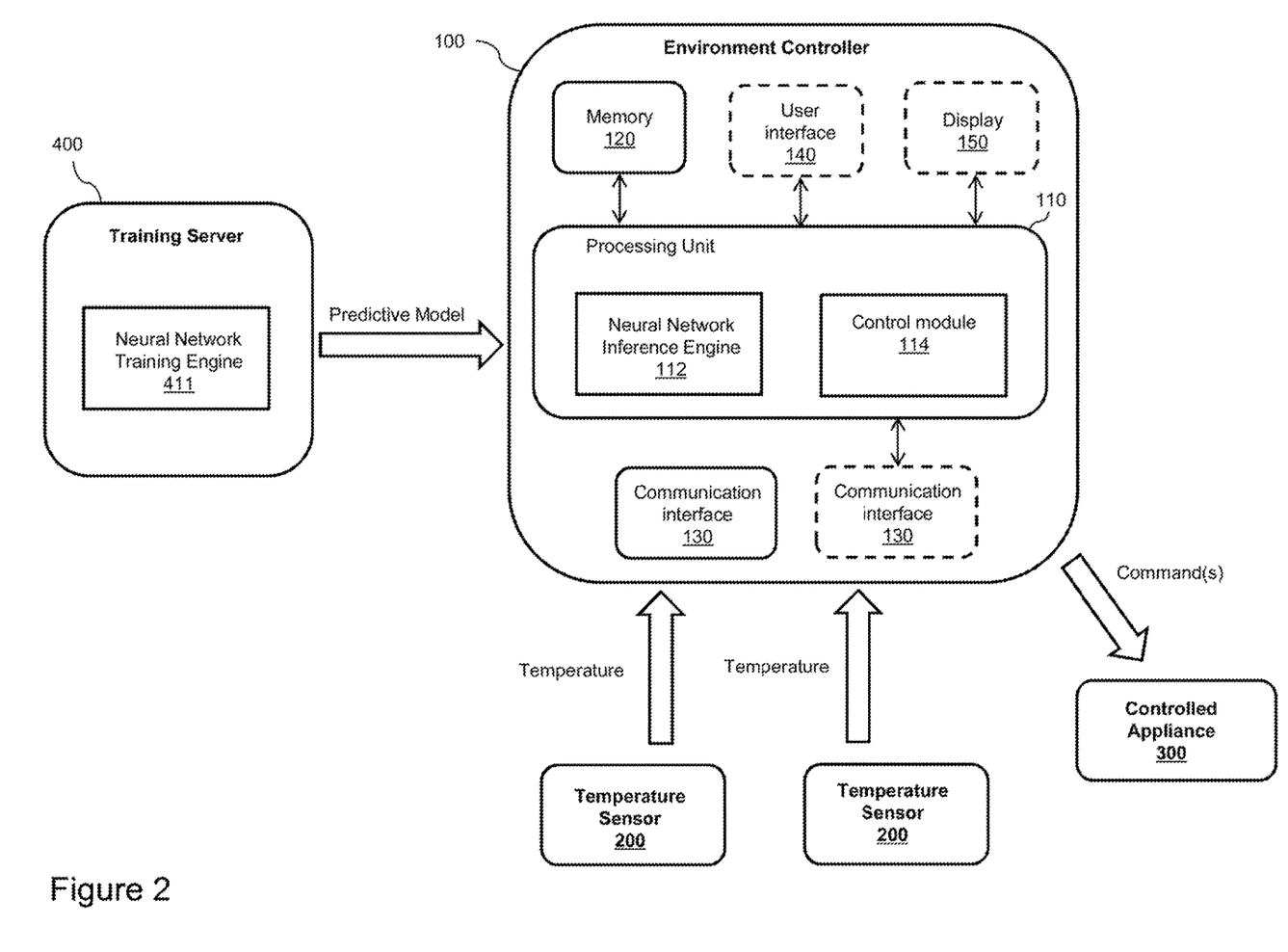
FIG. 2 illustrates the environment control system of FIG. 1 comprising an environment controller capable of inferring via a neural network a two-dimensional temperature mapping of an area.

FIGS. 1 and 2 represent an environment control system where an environment controller 100 exchanges data with other environment control devices (ECDs). The environment controller 100 is responsible for controlling the environment of an area of a building. The environment controller 100 receives from sensors 200 environmental characteristic values measured by the sensors 200. The environment controller 100 generates commands based on the received environmental characteristic values. The generated commands are transmitted to controlled appliances 300 (to control the operations of the controlled appliances 300).

The area under the control of the environment controller 100 is not represented in FIGS. 1 and 2 for simplification purposes. As mentioned previously, the area may consist of a room, a floor, an aisle, etc. However, any type of area located inside any type of building is considered within the scope of the present disclosure. The environment controller 100, the sensors 200 and the controlled appliance(s) 300 are located inside the area. Alternatively, the environment controller 100 is located outside of the area and remotely controls the area, through environmental data received from the sensors 200 and commands transmitted to the controlled appliance(s) 300.

Examples of sensors 200 include a temperature sensor (represented in FIG. 2), capable of measuring a temperature in the area and transmitting the temperature measured in the area to the environment controller 100. Other types of sensors 200 (e.g. a humidity sensor for measuring a humidity level in the area, a carbon dioxide (CO2) sensor for measuring a CO2 level in the area, a lightning sensor for measuring a lightning level in the area, an occupancy sensor for determining an occupancy in the area, etc.) could be used in the context of an environment control system managed by the environment controller 100. Furthermore, each environmental characteristic value measured by a sensor 200 may consist of either a single value (e.g. the current temperature is 25 degrees Celsius), or a range of values (e.g. the current temperature is in the range of 25 to 26 degrees Celsius).

Additional sensor(s) 200 may be deployed outside of the area and report their measurement(s) to the environment controller 100. For example, the area is a room of a building. An external temperature sensor 200 measures an external temperature outside the building and transmits the measured external temperature to the environment controller 100. Similarly, an external humidity sensor 200 measures an external humidity level outside the building and transmits the measured external humidity level to the environment controller 100.

Each controlled appliance 300 comprises at least one actuation module, to control the operations of the controlled appliance 300 based on the commands received from the environment controller 100. The actuation module can be of one of the following types: mechanical, pneumatic, hydraulic, electrical, electronical, a combination thereof, etc. The commands control operations of the at least one actuation module.

An example of a controlled appliance 300 consists of a VAV appliance. Examples of commands transmitted to the VAV appliance 300 include commands directed to one of the following: an actuation module controlling the speed of a fan, an actuation module controlling the pressure generated by a compressor, an actuation module controlling a valve defining the rate of an airflow, etc. This example is for illustration purposes only. Other types of controlled appliances 300 could be used in the context of an environment control system managed by the environment controller 100.

Details of the environment controller 100, sensors 200 and control appliance 300 will now be provided. Although a single controlled appliance 300 is represented in FIGS. 1 and 2 for simplification purposes, the environment controller 100 may be interacting with a plurality of controlled appliances 300.

The environment controller 100 comprises a processing unit 110, memory 120, and a communication interface 130. The environment controller 100 may comprise additional components, such as another communication interface 130, a user interface 140, a display 150, etc.

The processing unit 110 comprises one or more processors (not represented in the Figures) capable of executing instructions of a computer program. Each processor may further comprise one or several cores.

The memory 120 stores instructions of computer program(s) executed by the processing unit 110, data generated by the execution of the computer program(s), data received via the communication interface 130 (or another communication interface), etc. Only a single memory 120 is represented in the Figures, but the environment controller 100 may comprise several types of memories, including volatile memory (such as a volatile Random Access Memory (RAM), etc.) and non-volatile memory (such as a hard drive, electrically-erasable programmable read-only memory (EEPROM), etc.).

The communication interface 130 allows the environment controller 100 to exchange data with remote devices (e.g. sensors 200, controlled appliance 300, etc.) over a communication network (not represented in the Figures for simplification purposes). For example, the communication network is a wired communication network, such as an Ethernet network; and the communication interface 130 is adapted to support communication protocols used to exchange data over the Ethernet network. Other types of wired communication networks may also be supported by the communication interface 130. In another example, the communication network is a wireless communication network, such as a Wi-Fi network; and the communication interface 130 is adapted to support communication protocols used to exchange data over the Wi-Fi network. Other types of wireless communication network may also be supported by the communication interface 130, such as a wireless mesh network. In still another example, the environment controller 100 comprises two communication interfaces 130. The environment controller 100 communicates with the sensors 200 and controlled appliances 300 via a first communication interface 130 (e.g. a Wi-Fi interface); and communicates with user devices (not represented in FIGS. 1 and 2) via a second communication interface 130 (e.g. Bluetooth® or Bluetooth® Low Energy (BLE) interface). Each communication interface 130 usually comprises a combination of hardware and software executed by the hardware, for implementing the communication functionalities of the communication interface 130

A detailed representation of the components of the sensors 200 is not provided in the Figures for simplification purposes. The sensors 200 comprise at least one sensing module for detecting an environmental characteristic; and further comprises a communication interface for transmitting to the environment controller 100 an environmental characteristic value (e.g. temperature) corresponding to the detected environmental characteristic. The environmental characteristic value is transmitted over a communication network and received via the communication interface 130 of the environment controller 100. The sensors 200 may also comprise a processing unit for generating the environmental characteristic value based on the detected environmental characteristic.

A detailed representation of the components of the controlled appliance 300 is not provided in the Figures for simplification purposes. As mentioned previously, the controlled appliance 300 comprises at least one actuation module; and further comprises a communication interface for receiving one or more commands from the environment controller 100. The one or more commands control operations of the at least one actuation module. The one or more commands are transmitted over a communication network via the communication interface 130 of the environment controller 100. The controlled appliance 300 may also comprise a processing unit for controlling the operations of the at least one actuation module based on the received one or more commands.

Also represented in FIG. 2 is a training server 400. The training server 400 comprises a processing unit, memory and a communication interface (not represented in FIG. 2 for simplification purposes). The processing unit of the training server 400 executes a neural network training engine 411.

The execution of the neural network training engine 411 generates a predictive model, which is transmitted to the environment controller 100 via the communication interface of the training server 400. The predictive model is transmitted over a communication network and received via the communication interface 130 of the environment controller 100.

Reference is now made more particularly to FIGS. 3A, 3B, 3C and 3D, where a representation of the area 10 is provided.

Figure 3A:
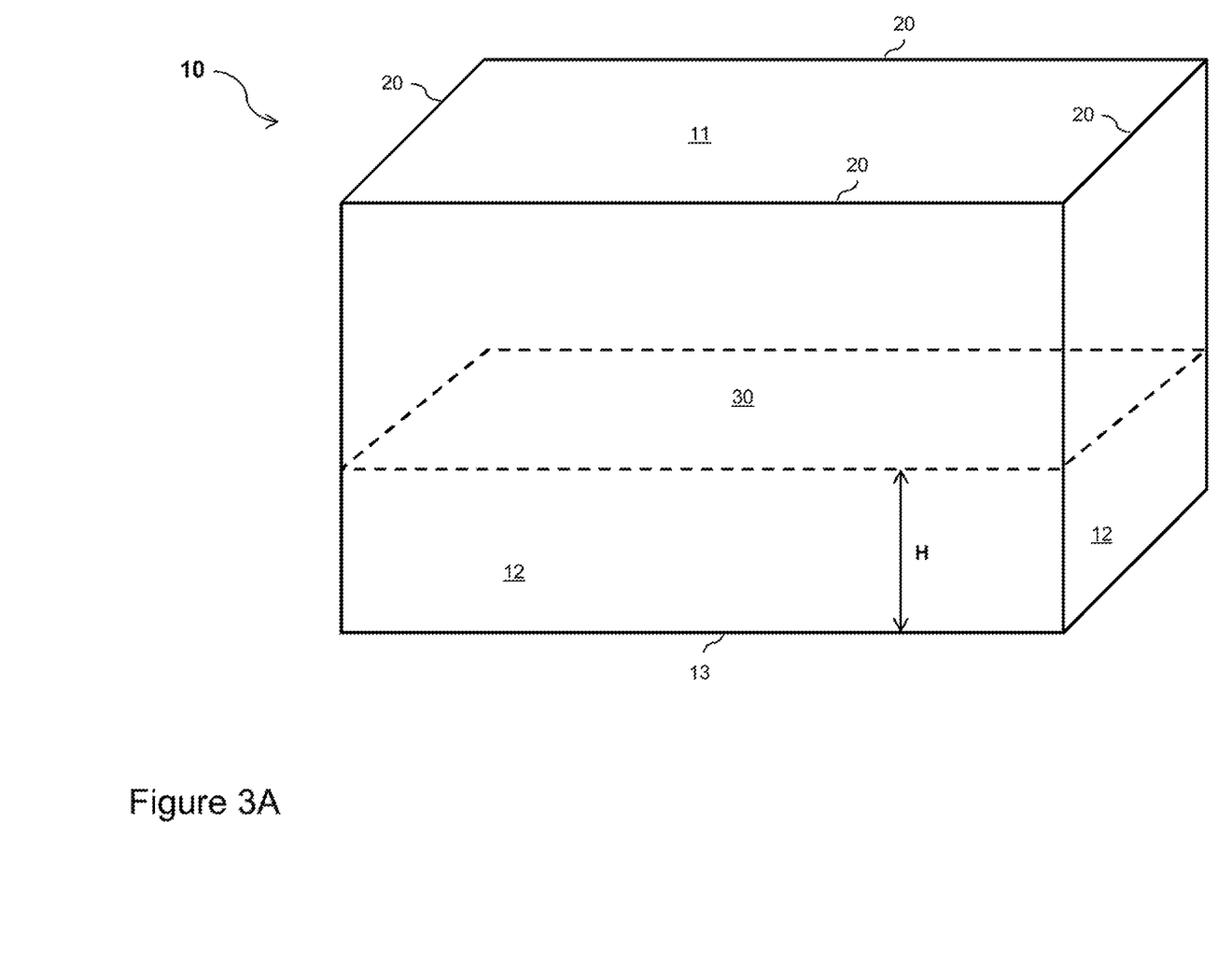
FIGS. 3A, 3B, 3C and 3D represent characteristics of the area where the environment controller of FIG. 2 is operating.
Figure 3B:
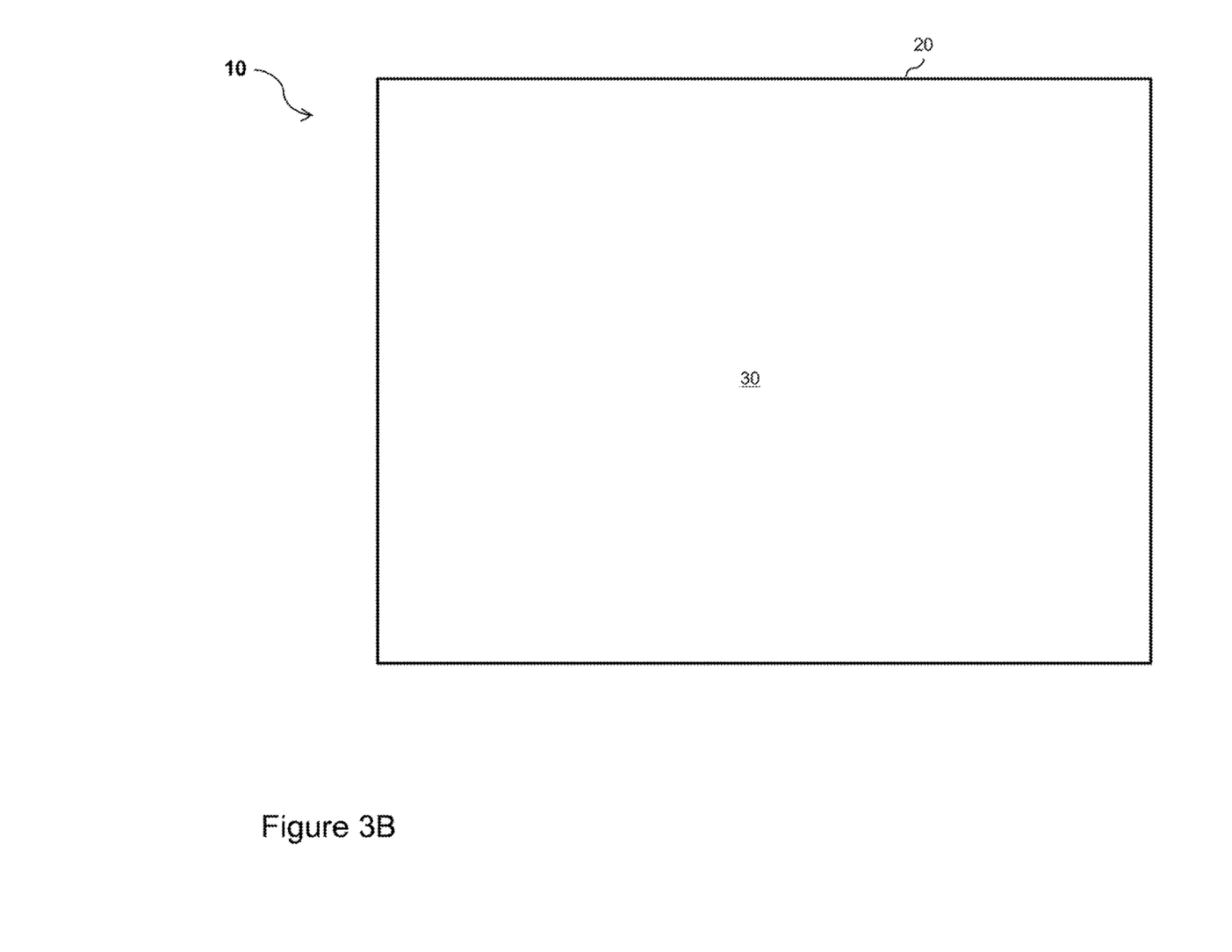

FIG. 3A is a perspective view of the area 10 and FIG. 3B is a top view of the area 10. For illustration purposes, the area 10 is a room having a substantially rectangular shape. The area 10 comprises a ceiling 11, a floor 13 and walls 12. A periphery 20 of the area 10 is defined. For example, as illustrated in FIG. 3A, the periphery 20 is the interface of the ceiling 11 and the walls 20. A plane 30 within the area 10 is also defined. For example, as illustrated in FIG. 3A, the plane 30 is a horizontal plane parallel to the floor 13 (and ceiling 11), and is located at a given height H above the floor 13. The height H may vary, so that the plane 30 may be located at any position between the floor 13 and the ceiling 11 (including the floor 13 and ceiling 11). The present disclosure is not limited to horizontal planes 30. For example, in an alternative implementation (not represented in the Figures), the plane 30 is a vertical plane parallel to a given one among the walls 12, and is located at a given distance D from the given wall 12.

Figure 3C:
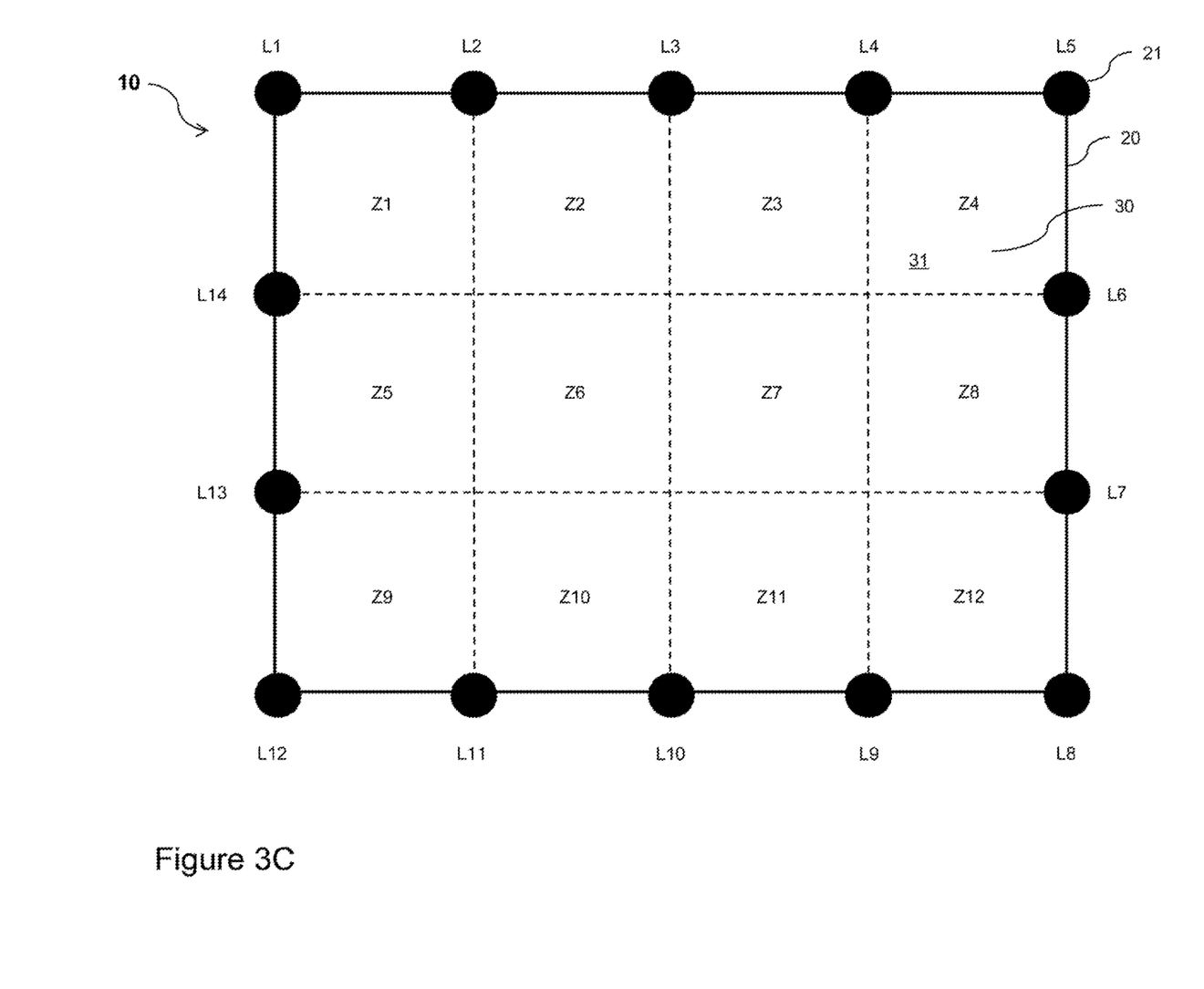
Figure 3D:
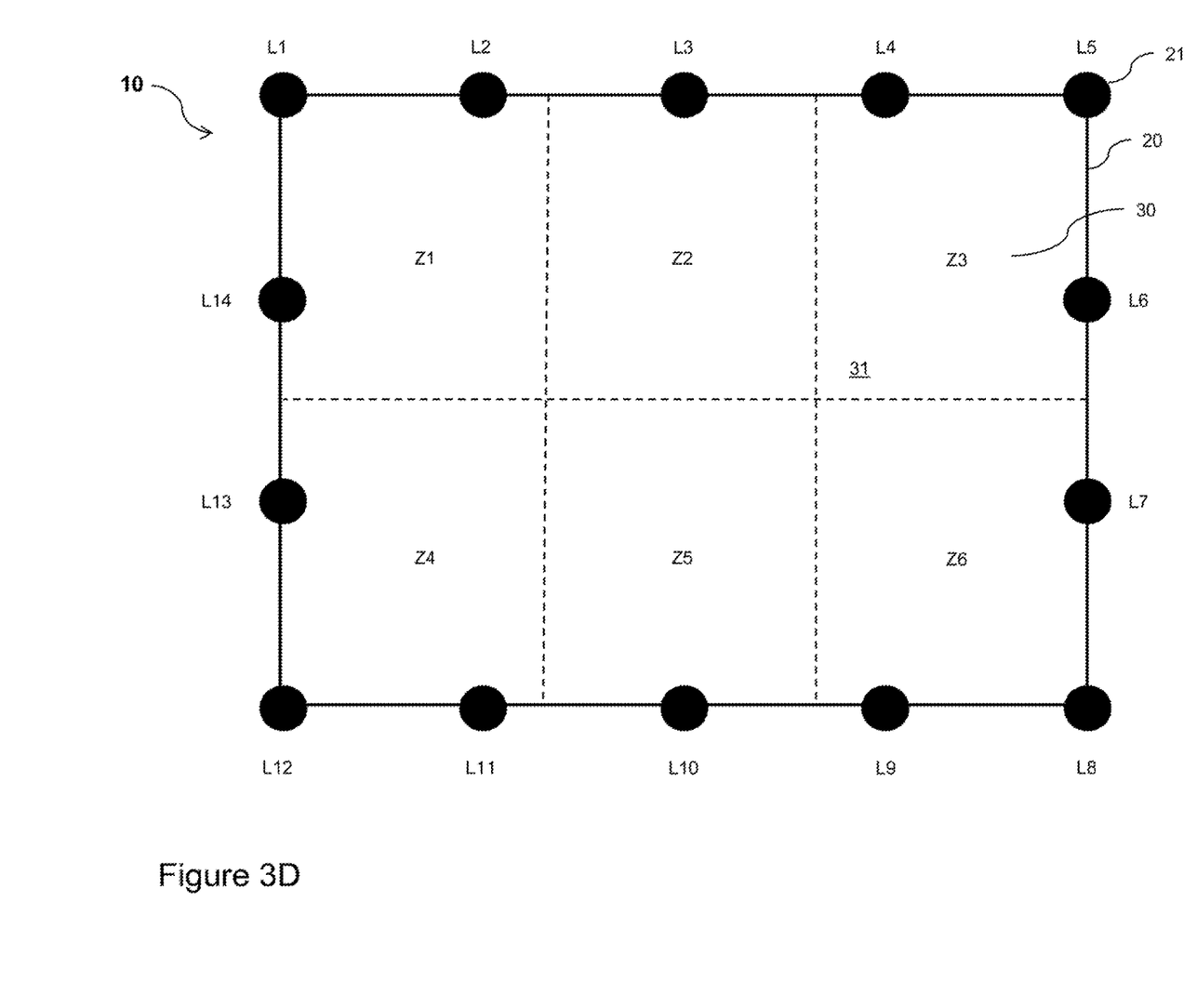

FIGS. 3C and 3D represent the periphery 20 comprising a plurality of locations 21 located on the periphery 20. FIG. 3C illustrates a first configuration with the periphery 20 comprising 14 locations (L1-L2-L3-L4-L5-L6-L7-L8-L9-L10-L11-L12-L13-L14). FIG. 3D illustrates a second configuration with the periphery 20 comprising the same 14 locations (L1-L2-L3-L4-L5-L6-L7-L8-L9-L10-L11-L12-L13-L14) as in FIG. 3C. The number of locations 21, the distribution of the locations 21 on the periphery 20, the distance between the locations 21, etc., may vary.

FIGS. 3C and 3D also represent a two-dimensional grid being mapped on the plane 30, where the two-dimensional grid is divided into a plurality of zones 31. FIG. 3C illustrates a first configuration with the plane 30 comprising 12 zones (Z1-Z2-Z3-Z4-Z5-Z6-Z7-Z8-Z9-Z10-Z11-Z12).

FIG. 3D illustrates a second configuration with the plane 30 comprising 6 zones (Z1-Z2-Z3-Z4-Z5-Z6). The number of zones 31, the shape of the zones 31, the size of the zones 31, etc., may vary. For example, referring to FIG. 3C, the zones Z1, Z2, Z5 and Z6 may be grouped into a single zone having four times the surface of the other zones. In another example, referring to FIG. 3C, the zones Z1 and Z2 may be grouped into a single zone, the zones Z5 and Z6 grouped into another single zone, these two single zones being rectangular instead of being square and having twice the size of the other zones. In still another example, referring to FIG. 3C, the zones Z1, Z4, Z9 and Z12 are not considered and the plane 30 comprises only height active zones (taken into consideration by the predictive model as illustrated in the following).

FIGS. 3C and 3D illustrate that for a given configuration of the locations 21 on the periphery 20, multiple configurations of the zones 31 in the plane 30 may be defined. More generally, multiple configurations of the locations 21 on the periphery 20 may be combined with multiple configurations of the zones 31 in the plane 30.

At each location 21 on the periphery 20, a temperature sensor 200 is deployed for measuring a temperature at the location 21. For example, the periphery 20 is a molding installed at the interface of the ceiling 11 and walls 12. The temperature sensors 200 are integrated into the molding and separated by a fixed distance (e.g. one temperature sensor 200 every foot).

The neural network inference engine 112 uses the predictive model to infer a temperature in each zone 31 of the plane 30 based on inputs comprising the temperatures measured by the temperature sensor 200 deployed at the locations 21 on the periphery 20. The inferred temperatures in the zones 31 may be used for different purposes. For example, a control module 114 generates one or more command for controlling one or more controlled appliance 300 based on the inferred temperatures in the zones 31. The control module 114 then transmits the command(s) to the control appliance(s) 300. Alternatively, the inferred temperatures in the zones 31 are transmitted to another device (not represented in FIG. 2 for simplification purposes), and the other device takes actions based on the transmitted inferred temperatures in the zones 31.

Figure 4:
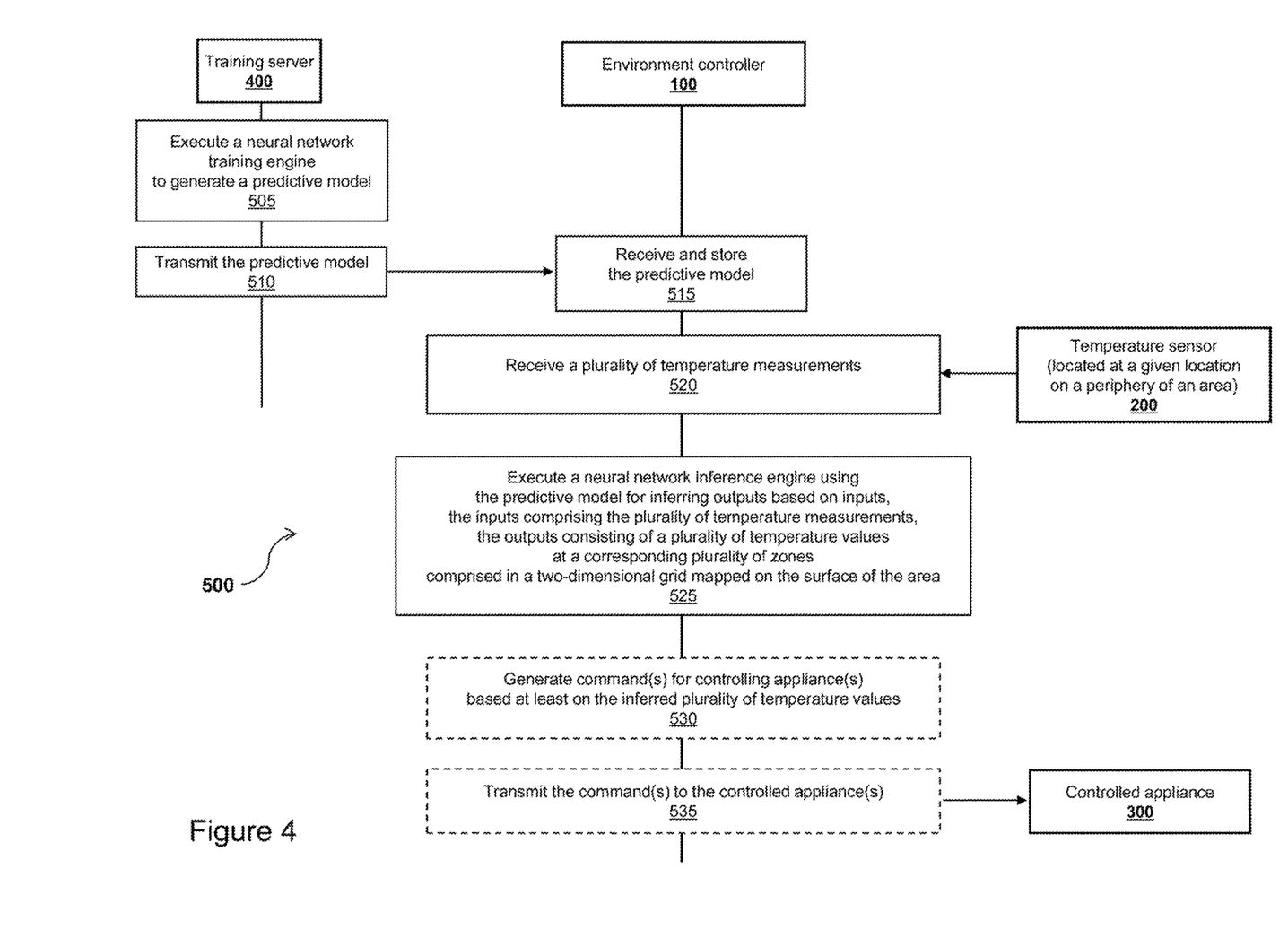
FIG. 4 illustrates a method for inferring via a neural network a two-dimensional temperature mapping of an area.

Reference is now made more particularly to FIG. 4. At least some of the steps of the method 500 represented in FIG. 4 are implemented by the environment controller 100 to infer via a neural network a two-dimensional temperature mapping of the area 10.

A dedicated computer program has instructions for implementing at least some of the steps of the method 500. The instructions are comprised in a non-transitory computer program product (e.g. the memory 120) of the environment controller 100. The instructions provide for inferring via a neural network a two-dimensional temperature mapping of the area 10, when executed by the processing unit 110 of the environment controller 100. The instructions are deliverable to the environment controller 100 via an electronically-readable media such as a storage media (e.g. CD-ROM, USB key, etc.), or via communication links (e.g. via a communication network through the communication interface 130). The dedicated computer program executed by the processing unit 110 comprises the neural network inference engine 112 and the control module 114.

The present disclosure is directed to environment control systems and therefore, the method 500 is described as being executed by the environment controller 100. However, the present disclosure is not limited to environment controllers 100 for executing the method 500. Other types of computing devices may also implement the method 500. Such a computing device includes memory for storing the predictive model, a processing unit for executing the neural network inference engine 112 and at least one communication interface for interacting with other devices (e.g. the temperatures sensors 200).

The method 500 comprises the step 505 of executing the neural network training engine 411 to generate the predictive model. Step 505 is performed by the processing unit of the training server 400.

The method 500 comprises the step 510 of transmitting the predictive model to the environment controller 100, via the communication interface of the training server 400. Step 510 is performed by the processing unit of the training server 400.

The method 500 comprises the step 515 of receiving the predictive model and storing the predictive model in the memory 120 of the environment controller 100. The predictive model is received via the communication interface 130 of the environment controller 100. Step 515 is performed by the processing unit 110 of the environment controller 100.

In an alternative implementation, the neural network training engine 411 is executed directly by the processing unit 110 of the environment controller 100. Thus, the predictive model is generated by the environment controller 100 and directly stored in its memory 120. In this implementation, a dedicated training server 400 is not used.

The method 500 comprises the step 520 of receiving a plurality of temperature measurements transmitted by a corresponding plurality of temperature sensors 200 located at a corresponding plurality of locations 21 on the periphery 20 of the area 10. The plurality of temperature measurements is received via the communication interface 130 of the environment controller 100. Step 520 is performed by the processing unit 110 of the environment controller 100. A single temperature sensor 200 is represented in FIG. 4 for simplification purposes. As mentioned previously, an exemplary plurality of locations 21 is illustrated in FIGS. 3C and 3D (L1-L2-L3-L4-L5-L6-L7-L8-L9-L10-L11-L12-L13-L14), where a corresponding plurality of temperature sensors 200 are deployed for respectively measuring and transmitting a temperature (to the environment controller 100).

The method 500 comprises the step 525 of executing the neural network inference engine 112 using the predictive model (stored at step 515) for inferring outputs based on inputs. Step 525 is performed by the processing unit 110 of the environment controller 100. The inputs include the plurality of consecutive temperature measurements (received at step 520). The outputs consist of a plurality of temperature values at the corresponding plurality of zones 31, the plurality of zones 31 being comprised in a two-dimensional grid mapped on the plane 30 within the area 10. As mentioned previously, a first exemplary plurality of zones 31 is illustrated in FIG. 3C (Z1-Z2-Z3-Z4-Z5-Z6-Z7-Z8-Z9-Z10-Z11-Z12) and a second exemplary plurality of zones 31 is illustrated in FIG. 3D (Z1-Z2-Z3-Z4-Z5-Z6). Additional input parameters may be used by the neural network inference engine 112, as detailed in the following.

Optionally, a humidity level measurement in the area 10 is also used for the inputs at step 525. As mentioned previously, the humidity level is measured in the area 10 by a humidity sensor 200 located in the area 10, and transmitted to the environment controller 100.

Optionally, a $CO_2$ level measurement in the area 10 is also used for the inputs at step 525. As mentioned previously, the CO2 level is measured in the area 10 by a CO2 sensor 200 located in the area 10, and transmitted to the environment controller 100.

Optionally, an external temperature measurement is also used for the inputs at step 525. As mentioned previously, the external temperature is measured outside the building (where the area 10 is located) by an external temperature sensor, and transmitted to the environment controller 100.

Optionally, an external humidity level measurement is also used for the inputs at step 525. As mentioned previously, the external humidity level is measured outside the building (where the area 10 is located) by an external humidity sensor, and transmitted to the environment controller 100.

Optionally, a period of time is also used for the inputs at step 525. Examples of periods of time include: day and night; morning, afternoon and evening; week days or weekends; a given time interval during the day (e.g. 7 am to 9 am, 9 am to 12 pm, 12 pm to 5 pm and 5 pm to 7 pm); a combination of some of the previous examples; etc. The current period of time used as input at step 525 is determined by the processing unit 110 of the environment controller 100.

The usage of the optional inputs (humidity level measurement in the area 10, CO2 level measurement in the area 10, external temperature measurement, external humidity level measurement, and period of time) in combination or individually may improve the accuracy and resiliency of the inferences performed by the neural network inference engine 112 (at the cost of complexifying the predictive model used by the neural network inference engine 112). The relevance of using at least some of the optional inputs is generally evaluated during a training phase, when the predictive model is generated (and tested) with a set of training (and testing) inputs and outputs dedicated to the training (and testing) phase. The usage of the optional inputs of the neural network inference engine 112 at step 525 has not been represented in FIG. 4 for simplification purposes.

The method 500 comprises the optional step 530 of generating one or more command for controlling one or more appliance 300. The generation of the one or more command is based at least on the plurality of temperature values inferred at step 525. Additional parameters may also be used for generating the one or more command. Step 530 is performed by the control module 114 executed by the processing unit 110 of the environment controller 100.

The method 500 comprises the optional step 535 of transmitting the one or more command to the one or more controlled appliance 300. Step 535 is performed by the control module 114 executed the processing unit 110 of the environment controller 100. The one or more command is transmitted via the communication interface 130 of the environment controller 100.

In an exemplary implementation of the method 500, the controlled appliances 300 consist of VAV appliances. A VAV appliance 300 is associated to each zone 31 of the plane 30 located within the area 10. Each VAV appliance 300 is used for controlling the temperature in the associated zone 31. At step 530, a command is generated for each VAV appliance 300 based on the temperature value inferred at step 525 for the associated zone 31. The commands generated at step 530 are respectively transmitted to the corresponding VAV appliances 300 at step 535. For example, a target temperature for the whole area 10 is 24 degrees Celsius. In a first zone Z1, the temperature value inferred at step 525 is 20 degrees Celsius. A command for raising the temperature from 20 to 24 degrees Celsius is sent to the VAV appliance 300 controlling the zone Z1. In a second zone Z2, the temperature value inferred at step 525 is 22 degrees Celsius. A command for raising the temperature from 22 to 24 degrees Celsius is sent to the VAV appliance 300 controlling the zone Z2. Alternatively, different target temperatures are defined for each zone 31. For instance, the target temperature allocated to the zone Z1 is 22 degrees Celsius. A command for raising the temperature from 20 to 22 degrees Celsius is sent to the VAV appliance 300 controlling the zone Z1. The target temperature allocated to the zone Z2 is 24 degrees Celsius. A command for raising the temperature from 22 to 24 degrees Celsius is sent to the VAV appliance 300 controlling the zone Z2.

The previous examples are for illustration purposes only. A person skilled in the art of environment control systems would readily understand that other procedures can be implemented for enforcing target temperature(s) in the different zones 31 based on the temperature values inferred at step 525 for the zones 31.

In a first implementation, the command(s) transmitted to the VAV appliances 300 comprise a temperature adjustment value (e.g. raise the temperature from 20 to 24 degrees Celsius or raise the temperature by 4 degrees Celsius). The VAV appliances 300 are in charge of converting the temperature adjustment value into actuating command(s) for controlling actuator(s) of the VAV appliances 300.

In a second implementation, the processing unit 110 of the environment controller 100 converts the temperature adjustment value into actuating command(s) for controlling actuator(s) of the VAV appliance(s) 300. The one or more command transmitted at step 535 comprises the internal command(s) for controlling the actuator(s) of the VAV appliance(s) 300.

As mentioned previously, examples of the actuating command(s) for controlling actuator(s) of the VAV appliance(s) 300 include actuating command(s) for controlling the speed of a fan, controlling the pressure generated by a compressor, controlling a valve defining the rate of an airflow, etc.

Although not represented in FIG. 4 for simplification purposes, the method 500 further comprises the optional step of applying the one or more command transmitted at step 535. This step is performed by the processing unit of each controlled appliance 300 receiving at least one command transmitted at step 535. The at least one command is received via the communication interface of the controlled appliance 300. The processing unit of the controlled appliance 300 controls the operations of one or more actuator of the controlled appliance 300 according to the received at least one command.

Steps 520, 525 and optional steps 530-535 are repeated each time a new set of temperature measurements is received at step 525.

Figure 5:
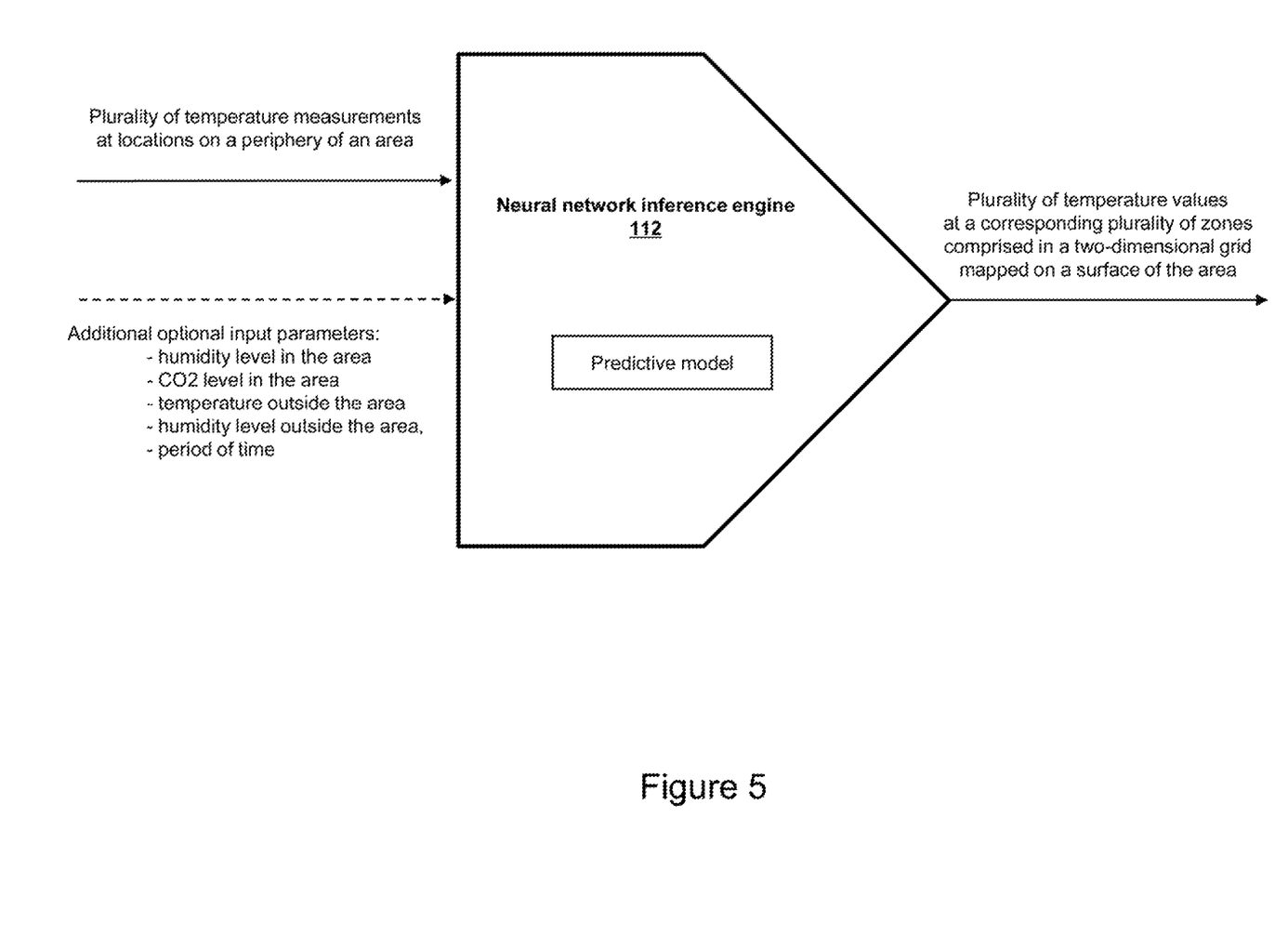
FIG. 5 is a schematic representations of a neural network inference engine executed by the environment controller of FIG. 2 according to the method of FIG. 4.

FIG. 5 illustrates the inputs and the outputs used by the neural network inference engine 112 when performing step 525.

The mechanism disclosed in the present disclosure takes advantage of the neural network technology, to infer during an operational phase the plurality of temperature values at the corresponding plurality of zones 31 (step 525), using the predictive model generated during the training phase (step 505).

The predictive model used by the neural network inference engine 112 is adapted for receiving the plurality of temperature measurements at the corresponding plurality of locations 21 as inputs, and for outputting the plurality of temperature values at the corresponding plurality of zones 31 as outputs. The predictive model includes the number of layers of the neural network, the number of nodes (also referred to as neurons) per layer, and the weights associated to each node. The first layer of nodes receives the inputs and the last layer of nodes calculates the outputs.

With respect to the number of nodes of the last layer of the neural network, it depends on the number of zones 31 of the plane 30 located within the area 10. There is one node for each zone 31. In the example illustrated in FIG. 3C, there are twelve zones 31, and thus the last layer of the neural network comprises twelve nodes. In the example illustrated in FIG. 3D, there are six zones 31, and thus the last layer of the neural network comprises six nodes.

With respect to the number of nodes of the first layer of the neural network, it depends on the number of locations 21 on the periphery 20 of the area 10. There is one node for each location 21. In the example illustrated in FIGS. 3C and 3D, there are fourteen locations 21, and thus the first layer of the neural network comprises fourteen nodes. The first layer of the neural network may include one additional node for each of the aforementioned optional parameter (e.g. humidity level measurement in the area 10, CO2 level measurement in the area 10, external temperature measurement, external humidity level measurement, and period of time).

During the training phase, the neural network training engine 411 is trained with a plurality of combination of inputs (each combination of inputs comprises a plurality of temperature measurements at the plurality of locations 21) and a corresponding plurality of combination of outputs (each corresponding combination of outputs comprises a plurality of temperature values at the plurality of zones 31). As is well known in the art of neural network, during the training phase, the neural network implemented by the neural network training engine 411 adjusts its weights. Furthermore, during the training phase, the number of layers of the neural network and the number of nodes per layer can be adjusted to improve the accuracy of the model. At the end of the training phase, the predictive model generated by the neural network training engine 411 includes the number of layers, the number of nodes per layer, and the weights.

The inputs and outputs for the training phase of the neural network are collected through an experimental process. One or more reference area 10 is used for the training. If several reference areas 10 are used, they all have the same number of locations 21 for deploying the temperature sensors 200 and the same number of zones 31 where the temperature shall be inferred during the operational phase. For instance, if the reference areas 10 are reference rooms, the surface and height of the reference rooms may vary, as long as the number of locations 21 and the number of zones 31 are the same for all the reference rooms. Thus, the distribution of the locations 21 (distance therebetween) and the geometrical characteristics of the zones 31 (shape and surface) may vary from one reference room to another, resulting in the generation of a predictive model that is more robust. However, in order to generate a predictive model adapted to all the reference rooms, the characteristics of the locations 21 and zones 31 need to have a degree of similarity sufficient for generalizing the predictive model to the whole set of reference rooms. This can be determined via experimentation during the training phase. A predictive model generated during the training phase which can be applied to different reference areas (e.g. different reference rooms), can be applied to the same reference areas (e.g. reference rooms) during the operation phase.

The temperature measured by the temperature sensors 200 at the locations 21 is varied experimentally (using appropriate means for heating or cooling the area(s) 10. Additional temperature sensors are used for measuring the temperature in the zones 31. Thus, a plurality of combinations of training inputs (temperatures measured at the locations 21) and corresponding outputs (temperatures measured at the zones 31) are measured and collected by a person in charge of the training. The training procedure may be at least partially automated for facilitating the collection of large amounts of training data. The predictive model is generated using this plurality of training inputs and corresponding outputs.

Various techniques well known in the art of neural networks are used for performing (and improving) the generation of the predictive model, such as forward and backward propagation, usage of bias in addition to the weights (bias and weights are generally collectively referred to as weights in the neural network terminology), reinforcement training, etc.

During the operational phase, the neural network inference engine 112 uses the predictive model (e.g. the values of the weights) determined during the training phase to infer the outputs based on the inputs, as is well known in the art.

Figure 6:
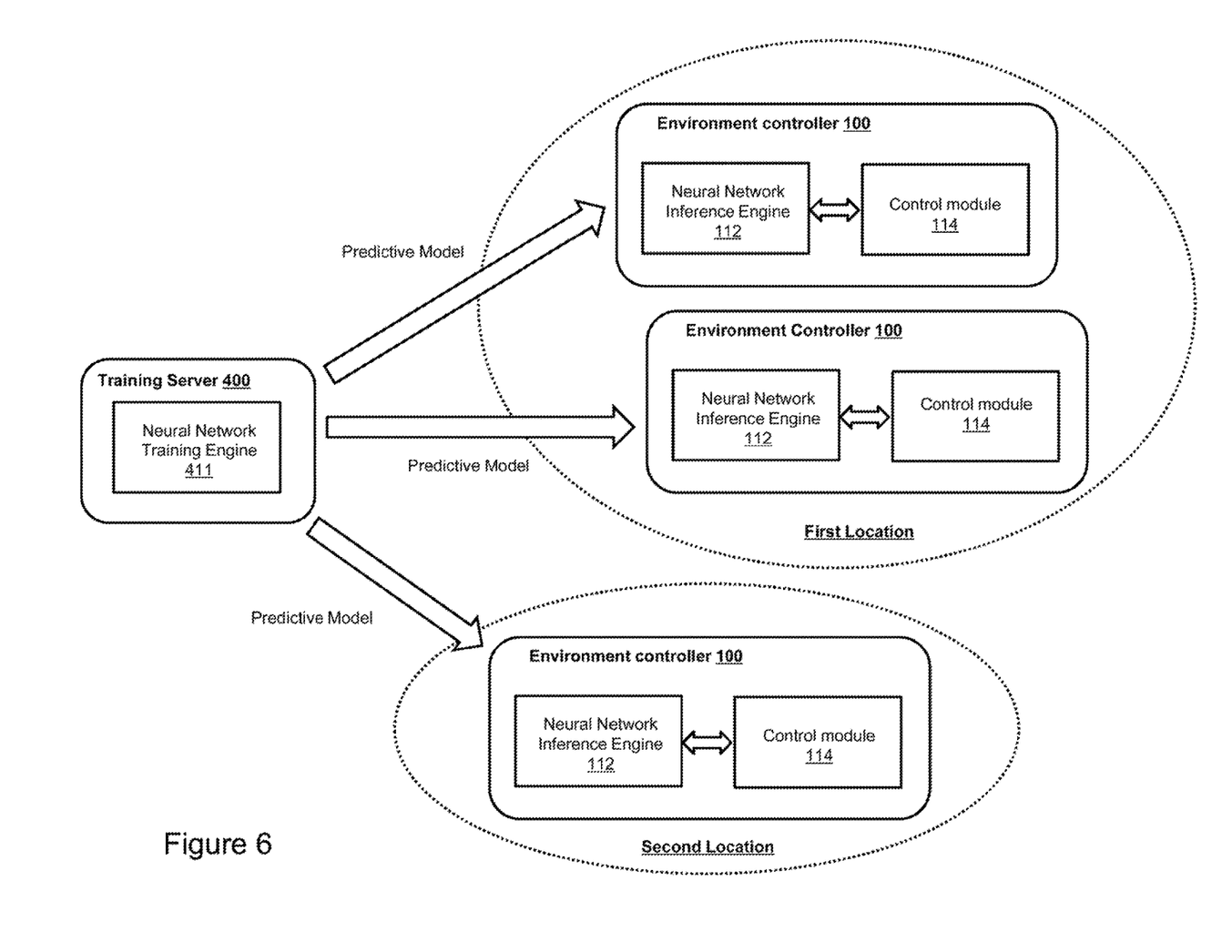
FIG. 6 represents an environment control system where several environment controllers implementing the method illustrated in FIG. 4 are deployed.

Reference is now made concurrently to FIGS. 2, 4 and 6, where FIG. 6 illustrates the usage of the method 500 in a large environment control system.

A first plurality of environment controllers 100 implementing the method 500 are deployed in different areas at a first location. Only two environment controllers 100 are represented for illustration purposes, but any number of environment controllers 100 may be deployed. The different areas are not represented for simplification purposes, and correspond to the previously described areas 10 as illustrated in FIGS. 3A-D.

A second plurality of environment controllers 100 implementing the method 500 are deployed in different areas at a second location. Only one environment controller 100 is represented for illustration purposes, but any number of environment controllers 100 may be deployed. The different areas are not represented for simplification purposes.

The first and second locations consist of different buildings, different floors of the same building, etc. Each area where an environment controller 100 is deployed is a room, an allay, an open space, etc. in one of the first or second location. Only two locations are represented for illustration purposes, but any number of locations may be considered.

Each environment controller 100 represented in FIG. 6 corresponds to the environment controller 100 represented in FIG. 2. Each environment controller 100 executes both the control module 114 and the neural network inference engine 112. Each environment controller 100 receives a predictive model from the centralized training server 400 (e.g. a cloud-based training server 400 in communication with the environment controllers 100 via a networking infrastructure, as is well known in the art). The same predictive model is used for all the environment controllers 100. Alternatively, a plurality of predictive models is generated for taking into account specific operating conditions of the environment controllers 100. For instance, a first predictive model is generated for environment controllers 100 located in an area having a small surface, a second predictive model is generated for environment controllers 100 located in an area having a medium surface, and a third predictive model is generated for environment controllers 100 located in an area having a large surface. For example, with reference to FIGS. 3C and 3D, the first predictive model is adapted for areas 10 having height locations 21 and four zones 31, the second predictive model is adapted for areas 10 having twelve locations 21 and nine zones 31, and the third predictive model is adapted for areas 10 having sixteen locations 21 and sixteen zones 31.

When several predictive models are used (instead of a single one), each one of the several predictive models is generated by the neural network training engine 411 and transmitted from the training server 400 to at least one of the environment controllers 100.

FIG. 6 illustrates a decentralized architecture, where the environment controllers 100 autonomously execute the neural network inference engine 112 for inferring a two-dimensional temperature mapping of an area using the predictive model as illustrated in the method 500.

In an alternative centralized architecture not represented in the Figures, the neural network inference engine 112 may be executed by a processing unit of a dedicated inference server serving a plurality of environment controllers 100. At least some of the steps of the method 500 (in particular step 525) are performed by the inference server. The environment controller 100 collects the plurality of temperature measurements (at the plurality of locations on the periphery of the area) and transmits the plurality of temperature measurements to the inference server. The inference server performs the inference of the plurality of temperature values (at the plurality of zones of the plane within the area) based on the plurality of temperature measurements using the adequate predictive model. The inference server transmits the inferred temperature values to the environment controller 100, where they are further used to control appliances (e.g. steps 530 and 535 of the method 500).

The centralized inference server may be used in the case where some of the environment controllers 100 do not have sufficient processing power and/or memory capacity for executing the neural network inference engine 112. The centralized inference server is a powerful server with high processing power and memory capacity capable of executing a neural network inference engine 112 using a complex predictive model (e.g. multiple layers with a large number of neurons for some of the layers). The centralized inference server is further capable of executing several neural network inference engines 112 in parallel for serving a plurality of environment controllers 100 in parallel.

All the temperatures mentioned in the present disclosure may be expressed in degrees Celsius or degrees Fahrenheit.

The present disclosure may be extended to a three dimensional temperature mapping of the area. In this case, the inputs of the predictive model still include the plurality of temperature measurements transmitted by a corresponding plurality of temperature sensors located at a corresponding plurality of locations on a periphery of the area. However, the outputs now consist of a plurality of temperature values at a corresponding plurality of zones, the plurality of zones being comprised in a three-dimensional grid mapped on the area. The zones are three-dimensional shapes, such as cubes located within the area.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for inferring via a neural network a two-dimensional temperature mapping of a room of a building, the method comprising:
storing a predictive model generated by a neural network training engine in a memory of a computing device;
receiving by a processing unit of the computing device a plurality of temperature measurements transmitted by a corresponding plurality of temperature sensors located at a corresponding plurality of locations on an interface of a ceiling and walls of the room;
executing by the processing unit of the computing device a neural network inference engine using the predictive model for inferring outputs based on inputs, the inputs of the neural network inference engine comprising the plurality of temperature measurements, the outputs of the neural network inference engine consisting of a plurality of inferred temperature values at a corresponding plurality of zones, the plurality of zones being comprised in a two-dimensional grid mapped on a plane within the room; and
generating by the processing unit of the computing device one or more command for controlling one or more appliance based at least on the plurality of inferred temperature values.

2. The method of claim 1, wherein the plane within the room is a horizontal plane parallel to a floor of the room and located at a given height above the floor.

3. The method of claim 1, wherein the predictive model comprises weights used by the neural network inference engine for inferring the outputs based on the inputs.

4. The method of claim 1, wherein the inputs further comprise at least one of the following: a humidity level measurement in the room, a carbon dioxide level measurement in the room, an external temperature measurement outside the room, an external humidity level measurement outside the room, and a period of time.

5. The method of claim 1, further comprising transmitting the one or more command to the one or more controlled appliance.

6. The method of claim 1, wherein the plurality of temperature sensors is integrated to a molding installed at the interface of the ceiling and walls of the room.

7. A non-transitory computer program product comprising instructions executable by a processing unit of a computing device, the execution of the instructions by the processing unit of the computing device providing for inferring via a neural network a two-dimensional temperature mapping of a room of a building by:
storing a predictive model generated by a neural network training engine in a memory of the computing device;
receiving by the processing unit of the computing device a plurality of temperature measurements transmitted by a corresponding plurality of temperature sensors located at a corresponding plurality of locations on an interface of a ceiling and walls of the room;
executing by the processing unit of the computing device a neural network inference engine using the predictive model for inferring outputs based on inputs, the inputs of the neural network inference engine comprising the plurality of temperature measurements, the outputs of the neural network inference engine consisting of a plurality of inferred temperature values at a corresponding plurality of zones, the plurality of zones being comprised in a two-dimensional grid mapped on a plane within the room; and
generating by the processing unit of the computing device one or more command for controlling one or more appliance based at least on the plurality of inferred temperature values.

8. The computer program product of claim 7, wherein the predictive model comprises weights used by the neural network inference engine for inferring the outputs based on the inputs.

9. The computer program product of claim 7, wherein the execution of the instructions by the processing unit of the computing device further effect: transmitting the one or more command to the one or more controlled appliance.

10. The computer program product of claim 7, wherein the plurality of temperature sensors is integrated to a molding installed at the interface of the ceiling and walls of the room.

11. A computing device for inferring via a neural network a two-dimensional temperature mapping of a room of a building, the computing device comprising:
 at least one communication interface;
 memory for storing a predictive model generated by a neural network training engine; and
 a processing unit for:
  receiving via the at least one communication interface a plurality of temperature measurements transmitted by a corresponding plurality of temperature sensors located at a corresponding plurality of locations on an interface of a ceiling and walls of the room;
  executing a neural network inference engine using the predictive model for inferring outputs based on inputs, the inputs of the neural network inference engine comprising the plurality of temperature measurements, the outputs of the neural network inference engine consisting of a plurality of inferred temperature values at a corresponding plurality of zones, the plurality of zones being comprised in a two-dimensional grid mapped on a plane within the room; and
  generating one or more command for controlling one or more appliance based at least on the plurality of inferred temperature values.

12. The computing device of claim 11, wherein the plane within the room is a horizontal plane parallel to a floor of the room and located at a given height above the floor.

13. The computing device of claim 11, wherein the predictive model comprises weights used by the neural network inference engine for inferring the outputs based on the inputs.

14. The computing device of claim 11, wherein the inputs further comprise at least one of the following: a humidity level measurement in the room, a carbon dioxide level measurement in the room, an external temperature measurement outside the room, an external humidity level measurement outside the room, and a period of time.

15. The computing device of claim 11, wherein the processing unit further transmits via the at least one communication interface the one or more command to the one or more controlled appliance.

16. The computing device of claim 11, wherein the plurality of temperature sensors is integrated to a molding installed at the interface of the ceiling and walls of the room.

* * * * *